United States Patent
Yanchelik et al.

(10) Patent No.: US 10,344,908 B2
(45) Date of Patent: Jul. 9, 2019

(54) QUICK MOUNT ADAPTER

(71) Applicant: Topcon Positioning Systems, Inc., Moscow (RU)

(72) Inventors: Pavel Stanislavovich Yanchelik, Moskovskaya oblast (RU); Alexandr Anatolyevich Agafonov, Moskovskaya oblast (RU)

(73) Assignee: TOPCON POSITIONING SYSTEMS, INC., Livermore, CA (US)

( * ) Notice: Subject to any disclaimer, the term of this patent is extended or adjusted under 35 U.S.C. 154(b) by 0 days.

(21) Appl. No.: 15/766,053

(22) PCT Filed: Aug. 15, 2016

(86) PCT No.: PCT/RU2016/000545
§ 371 (c)(1),
(2) Date: Apr. 5, 2018

(87) PCT Pub. No.: WO2018/034581
PCT Pub. Date: Feb. 22, 2018

(65) Prior Publication Data
US 2018/0283599 A1 Oct. 4, 2018

(51) Int. Cl.
 *F16M 11/04* (2006.01)
 *G12B 9/00* (2006.01)
 *G12B 9/08* (2006.01)

(52) U.S. Cl.
 CPC ........... *F16M 11/041* (2013.01); *F16M 11/04* (2013.01); *G12B 9/00* (2013.01); *G12B 9/08* (2013.01)

(58) Field of Classification Search
 CPC ........ F16M 11/041; F16M 11/04; G12B 9/00; G12B 9/08

USPC ......... 248/124.1, 125.8, 178.1, 187.1, 206.5, 248/224.8, 316.2, 371, 429, 205.1
See application file for complete search history.

(56) References Cited

U.S. PATENT DOCUMENTS

| | | | | |
|---|---|---|---|---|
| 1,878,320 A | * | 9/1932 | Potter | ...................... F16M 7/00 248/187.1 |
| 2,767,989 A | * | 10/1956 | Luebbers | ................ F16M 11/08 248/187.1 |
| 4,238,164 A | * | 12/1980 | Mazzolla | ............ B05C 17/0205 403/109.5 |
| 5,924,658 A | * | 7/1999 | Shiery | ................. A61M 5/1415 248/125.8 |

(Continued)

FOREIGN PATENT DOCUMENTS

| WO | 1995/021038 | 8/1995 |
|---|---|---|
| WO | 2005/078234 A1 | 8/2005 |
| WO | 2010/059200 A1 | 5/2010 |

OTHER PUBLICATIONS

International Search Report and Written Opinion dated May 18, 2017, in connection with International Patent Application No. PCT/RU2016/000545, 6 pgs.

*Primary Examiner* — Muhammad Ijaz
(74) *Attorney, Agent, or Firm* — Chiesa Shahinian & Giantomasi PC

(57) ABSTRACT

A quick mount adapter for mounting and fixing mountable devices, such as surveying equipment, on a support apparatus, such as a tripod or pole. The quick mount adapter allows a mountable device to be quickly and easily mounted on a support apparatus without the need for screwing the mountable device onto the support apparatus with a threaded joint.

25 Claims, 6 Drawing Sheets

(56) References Cited

U.S. PATENT DOCUMENTS

| | | |
|---|---|---|
| 6,186,037 B1 | 2/2001 | Ricci et al. |
| 8,011,848 B2 | 9/2011 | Sockman et al. |
| 2017/0167658 A1* | 6/2017 | Goetz .................... A23N 12/02 |
| 2018/0283599 A1* | 10/2018 | Yanchelik ................ G12B 9/00 |

* cited by examiner

QUICK MOUNT ADAPTER

CROSS-REFERENCE TO RELATED APPLICATIONS

This application is a national stage (under 35 U.S.C. 371) of International Patent Application No. PCT/RU2016/000545, filed Aug. 15, 2016, which is herein incorporated by reference in its entirety.

TECHNICAL FIELD

The present invention relates generally to a quick mount adapter for surveying equipment and, more particularly, to a quick mount adapter for mounting and fixing surveying equipment on a tripod or pole.

BACKGROUND

Surveying equipment, such as theodolites, total stations, and automatic levels, are often mounted on a tripod or pole. A threaded joint, such as a ⅝-11 UNC thread, is typically used to connect the surveying equipment to the tripod or pole. The tripod or pole is typically equipped with an external threaded screw, and in order to mount the surveying equipment, a user must properly align the surveying equipment and then tighten the external threaded screw of the tripod or pole to engage with base of the surveying equipment.

BRIEF SUMMARY OF THE EMBODIMENTS

In accordance with various embodiments, a quick mount adapter is provided that allows a user to mount a surveying instrument on a tripod or pole without the need to screw the equipment on with a threaded joint, thereby facilitating and speeding up the installation of the surveying instrument during operation. The quick mount adapter serves as a connector on the tripod or pole between the threaded joint and the surveying equipment being mounted.

In accordance with one embodiment, a quick mount adapter for mounting a mountable device onto a support apparatus comprises a main body including an internal threading for attaching the main body to an external screw of the support apparatus, a rotatable cylinder rotatable with respect to the main body, a locking cover attached to the main body and disposed above the rotatable cylinder, a catcher attached to the locking cover and comprising a shaft having a narrow upper part and a wide lower part, a collet clamp moveable in a translational direction with respect to the main body and comprising a plurality of collets that grip the shaft of the catcher, and lead screws fixed to the collet clamp that transfer rotational movement of the rotatable cylinder to translational movement of the collet clamp such that rotation of the rotatable cylinder causes the collet clamp to move between a first position in which the collets are in an undisturbed state around the narrow part of the shaft of the catcher and a second position in which the collets grip the wide part of the shaft of the catcher.

In accordance with another embodiment, a system comprises a support apparatus comprising an external threaded screw, a mountable device comprising a threaded socket, and a quick mount adapter for mounting the mountable device on the support apparatus. The quick mount adapter comprises a main body including an internal threading that attaches the main body to the external screw of the support apparatus, a rotatable cylinder rotatable with respect to the main body, a locking cover attached to the main body and disposed above the rotatable cylinder, a catcher extending from the locking cover to be inserted within the socket of the mountable device and comprising a shaft having a narrow upper part and a wide lower part, a collet clamp moveable in a translational direction with respect to the main body and comprising a plurality of collets that grip the shaft of the catcher, each of the plurality of collets comprising a thickened end portion, and lead screws fixed to the collet clamp that transfer rotational movement of the rotatable cylinder to translational movement of the collet clamp such that rotation of the rotatable cylinder causes the collet clamp to move between a first position in which the collets are in an undisturbed state around the narrow part of the shaft of the catcher and a second position in which the collets grip the wide part of the shaft of the catcher and the thickened end portion of each of the plurality of collets engages with an inner portion of the socket of the mountable device to fix the mountable device on quick mount adapter.

These and other advantages of the embodiments will be apparent to those of ordinary skill in the art by reference to the following detailed description and the accompanying drawings.

DETAILED DESCRIPTION

In accordance with various embodiments, a quick mount adapter is provided that allows a user to mount surveying equipment, or other types of mountable equipment, on a tripod or pole without the need to screw the equipment on with a threaded joint, thereby facilitating and speeding up the installation of the surveying equipment during operation. The quick mount adapter serves as a connector on the tripod or pole between the threaded joint and the surveying equipment being mounted.

Figure 1:
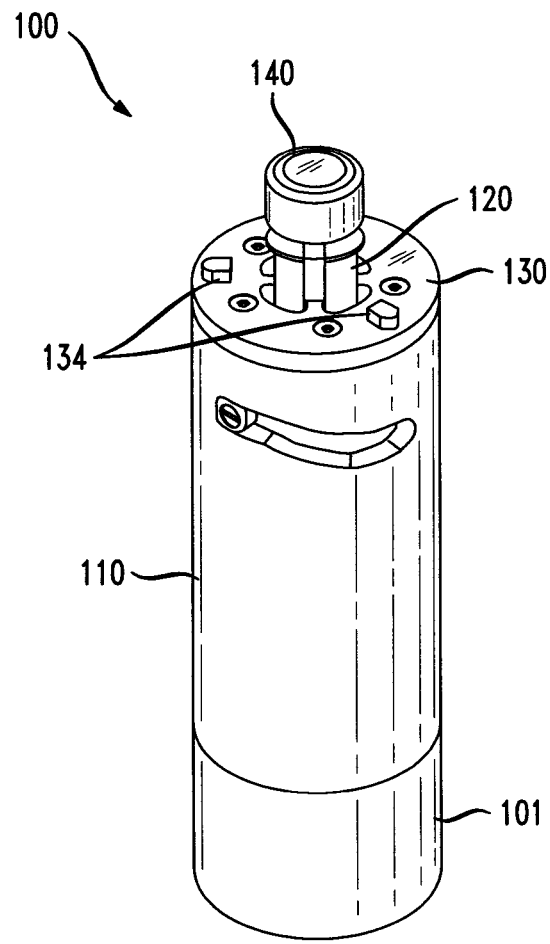
FIG. 1 illustrates a general view of a quick mount adapter according to an embodiment of the present invention.

FIG. 1 illustrates a general view of a quick mount adapter 100 according to an embodiment of the present invention. The quick mount adapter 100 is used to mount and fix a mountable device, such as geodetic/surveying equipment, onto a support apparatus, such as a tripod or a pole, with an external guided screw. As used herein, the term "mountable device" refers to any device, instrument, or equipment that can be mounted on a support apparatus, such as a tripod or pole, via a threaded joint. In accordance with various embodiments, the mountable device mounted using the quick mount adapter 100 may be a geodetic/surveying instrument, such as a theodolite, total station, automatic level, Global Navigation Satellite System (GNSS) receiver, GNSS antenna, laser level, digital level, geodetic reflector, Millimeter (MM) Global Positioning System (GPS) Transmitter and Sensor, or other surveying accessory equipment, but the present invention is not limited thereto. In other embodiments, the quick mount adapter 100 may be used to mount other types of devices, such as cameras, video cameras, various optical equipment or lighting equipment, etc., to a support apparatus. As used herein, the term "support apparatus" refers to any tripod, pole, or stand to which a mountable device can be mounted via a threaded joint.

The quick mount adapter 100 serves as a connector between the threaded screw on the support apparatus and the mountable device. The quick mount adapter 100 frees the user from the need of screwing a mountable device onto the external threaded screw of the support apparatus, thereby facilitating and speeding up the installation of the mountable device onto the support apparatus and the subsequent removal of the mountable device from the support apparatus. As shown in FIG. 1, the quick mount adapter includes a main body 101, a rotatable cylinder 110, a collet clamp 120, a locking cover 130, and a catcher 140. The main body 101 of the quick mount adapter 100 has an internal threaded groove that is screwed onto the external threaded screw of the support apparatus in order to fasten the quick mount adapter 100 to the support apparatus. The size of the threading of the quick mount adapter is selected to ensure compatibility with the support apparatus and the mountable devices that can be mounted to the support apparatus. In an advantageous embodiment, the quick mount adapter may have ⅝-11 UNC internal threading to in order to attach to support apparatus having a ⅝-11 UNC threaded screw. The top portion of the catcher 140 is sized to engage with and fit within a socket of the mountable device. In an advantageous embodiment, the diameter of the top portion of the catcher 140 can be smaller than a ⅝-11 UNC thread in order to fit within a 5⅝/11 UNC threaded socket of the mountable device without being screwed in. A top surface of the locking cover 130 can be formed with bosses 134, which engage with slots on the mountable device in order to prevent the mountable device from rotating about a vertical axis when the mountable device is mounted to the support apparatus using the quick mount adapter 100.

Figure 2:
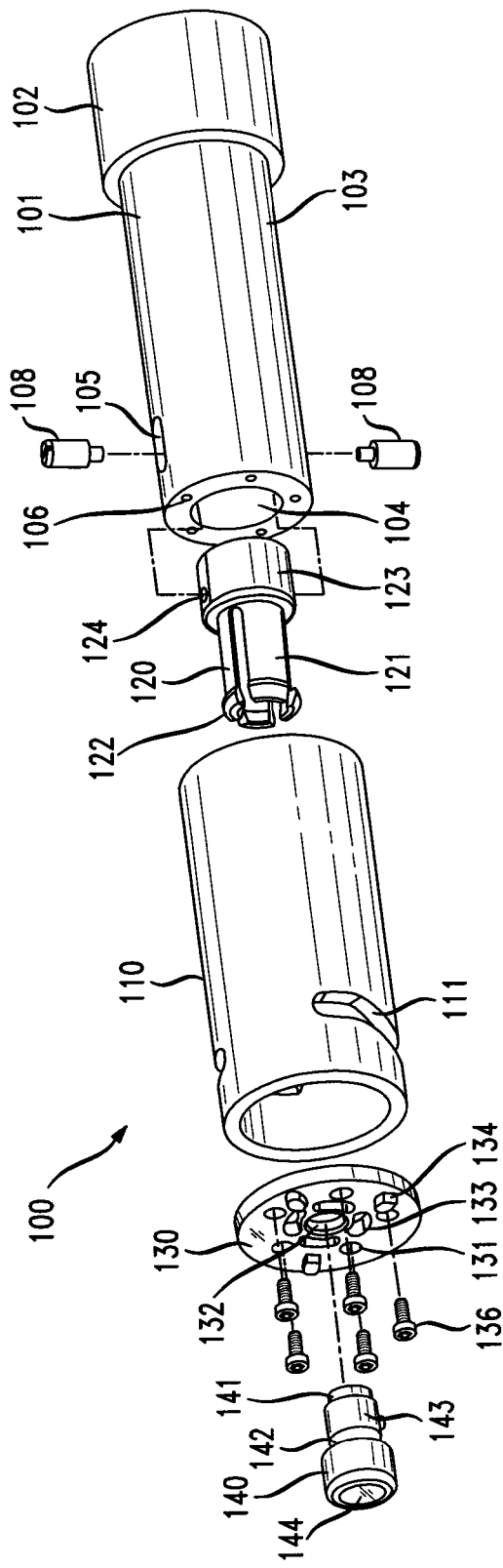
FIG. 2 illustrates a detailed view of the structure of the quick mount adapter according to an embodiment of the present invention.

FIG. 2 illustrates a detailed view of the structure of the quick mount adapter 100 according to an embodiment of the present invention. As shown in FIG. 2, the main body 101 of the quick mount adapter 100 includes a base portion 102 and upper portion 103 extending from the base portion 102. The upper portion 103 of the main body 101 has a smaller diameter than the base portion 102, which allows the rotatable cylinder 110 to be installed on the upper portion 103 and sit flush with the base portion 102. The main body 101 is hollow and has internal threading which allows the main body 101 of the quick mount adapter 100 to fasten onto the threaded screw of the support apparatus. For example, the internal threading of the main body may be ⅝-11 UNC, but the present invention is not limited thereto. The upper portion 103 of the main body 101 has a central lead opening 104 that accommodates the collet clamp 120, side openings 105 for lead screws 108, and threaded holes 106 for fixing the locking cover 130 to the main body 101.

The rotatable cylinder 110 is disposed over the upper portion 103 of the main body 100, such that the upper portion 103 is inside of the rotatable cylinder 110, and sits on top of the base portion 102 of the main body 101. The outer diameter of the rotatable cylinder 110 may be equal to the diameter of the base portion 102 of the main body 101, such that the outer surface of the rotatable cylinder 110 is flush with the outer surface of the base portion 102 of the main body 101. The length of the rotatable cylinder 110 may be equal to the length of the upper portion 103 of the main body 101. The rotatable cylinder 110 is rotatable with respect to the upper portion 103 of the main body 100. In an advantageous embodiment, the rotatable cylinder 110 is made of an antifriction material (i.e., a material with a low coefficient of friction). For example, the rotatable cylinder 110 can be made of nylon or polytetrafluoroethylene (PTFE), but the present invention is not limited thereto. Alternatively, the rotatable cylinder 100 can be coated with an antifriction coating, or a lubricant can be used to reduce friction between the inner surface of the rotatable cylinder 110 and the outer surface of the upper portion 103 of the main body 101. The rotatable cylinder 110 includes two bayonet slots 111 to transfer rotational movement of the rotatable cylinder 110 into translational movement via the lead screws 108.

The collet clamp 120 includes a plurality of collets 121, each with a thickened portion 122 at the end. The collets 121 are spring leaves that surround and grip a shaft of the catcher 140. In the embodiment of FIGS. 1 and 2, the collet clamp 120 includes four collets 121 (spring leaves), but the present invention is not limited thereto and more or less collets/spring leaves may be used. In an exemplary implementation, the collets 121 may be made of spring steel. The collets 121 extend from a bottom portion 123 of the collet clamp 120 which is accommodated in the central lead opening 104 of the main body 101. The bottom portion 123 of the collet clamp 120 has threaded holes 124 for the lead screws 108. The collet clamp 120 is moveable in a vertical direction within the upper portion 103 of the main body 101. The collet clamp 120 together with the catcher 140, and as the collet clamp 120 moves downwards (i.e., towards the base portion 102), the catcher 140 opens the collets 121 causing the thickened portions 122 of the collets 121 to hold the mountable device on the quick mount adapter 100.

The lead screws 108 are fixed in the threaded holes 124 of the collet clamp 120 and transfer rotational motion of the rotatable cylinder 110 into translational movement of the collet clamp 120. Outer portions of the lead screws pass through the side openings 105 of the upper portion 103 of the main body 101 and are accommodated in the bayonet slots 111 of the rotatable cylinder 110. The side openings 105 in the main body 101 permit the lead screws 108 to move with the collet clamp 120 in a vertical direction with respect to the upper portion 103 of the main body 101 (i.e., toward or away from the base portion 102). The bayonet slots 111 of the rotatable cylinder 110 are sloped such that when the rotatable cylinder 110 is rotated in a first direction (e.g., clockwise), the bayonet slots 111 force the lead screws 108 accommodated therein to move downward (i.e., toward the base portion 102) within the side openings 105 of the main body 101. Since the lead screws 108 are fixed in the collet clamp 120, the downward movement of the lead screws 108 causes the collet clamp 120 to move downward within the upper portion 103 of the main body 101.

The locking cover 130 fixes the catcher 140 in place and prevents axial movement of the rotatable cylinder 110. The locking cover 130 includes screw holes 131 that are aligned with the threaded holes 106 on the upper surface of the main body 101. The locking cover 130 is disposed above the rotatable cylinder 110, and the locking cover 130 is attached to the main body 101 using screws 136 that are threaded through the screw holes 131 of the locking cover 130 into the corresponding threaded holes 106 of the main body 101. For example, the screws 136 may be M2 screws, but the present invention is not limited thereto. In the embodiment of FIGS. 1 and 2, five screws 136 are used to connect the locking cover 130 to the main body 101, but the present invention is not limited thereto and the number of screws 136, screw holes 131, and threaded holes 106 may vary. The diameter of the locking cover 130 may be equal to the diameter of the rotatable cylinder 110 and the diameter of the base portion 102 of the main body 101. The locking cover 130 includes a center threaded hole 132 in which a threaded portion of the catcher 140 is fixed, and collet slots 133 surrounding the center threaded hole 132. The collets 121 of the collet clamp 120 pass through the collet slots 133 of the locking cover 130 to surround and grip a shaft of the catcher 140. The number of collet slots 133 corresponds to the number of collets 121 of the collet clamp 120. In the embodiment of FIGS. 1 and 2, there are four collet slots 133 corresponding to the four collets 121 of the collet clamp 120. The locking cover 130 includes a plurality of bosses 134. In an advantageous embodiment, a bottom surface of the mountable device or a special insert installed within the mountable device can be formed with slots corresponding to the bosses 134. The bosses 134 are raised portions protruding from an upper surface of the locking cover 130 that engage with the slots on the bottom surface of the mountable device or special insert to prevent the mountable device from rotating when mounted on the quick mount adapter 100. In the embodiment of FIGS. 1 and 2, the locking cover 130 has three bosses 134, but the present invention is not limited thereto and more or less bosses may be used.

The catcher 140 includes a threaded portion 141, a shaft having a narrow part 142 and a wide part 143, and a head 144. The catcher 140 is installed on the locking cover using a threaded joint, by fixing the threaded portion 141 of the catcher 140 into the center threaded hole 132 of the locking cover 130. The shaft of the catcher 140 is between the threaded portion 141 and the head 144. The narrow part 142 is the upper portion of the shaft (adjacent to the head 144) and the wide part 143 is the lower portion of the shaft (adjacent to the threaded portion 141). The wide part 143 of the shaft has a greater diameter than the narrow part 142 of the shaft. The collets 121 of the collet clamp 120 surround and grip the shaft of the catcher 140, and when the collet clamp 120 moves downward, the collets 121 move from the narrow part 142 to the wide part 143 of the shaft, and the wide part 143 causes the collets 121 to be opened outward. When the collets 121 are forced to open due to the wide part 143 of the shaft of the catcher 140, the thickened portions 122 at the ends of the collets 121 grip an inner portion of the socket of a mountable device, thus locking the mountable device onto the quick mount adapter 100. The head 144 of the catcher 140 is sized to fit within the socket of the mountable device. In an advantageous embodiment, the head 144 of the catcher 140 can be smaller than a ⅝-11 UNC thread in order to fit within a ⅝-11 UNC threaded socket of the mountable device without being screwed in.

Figure 3:
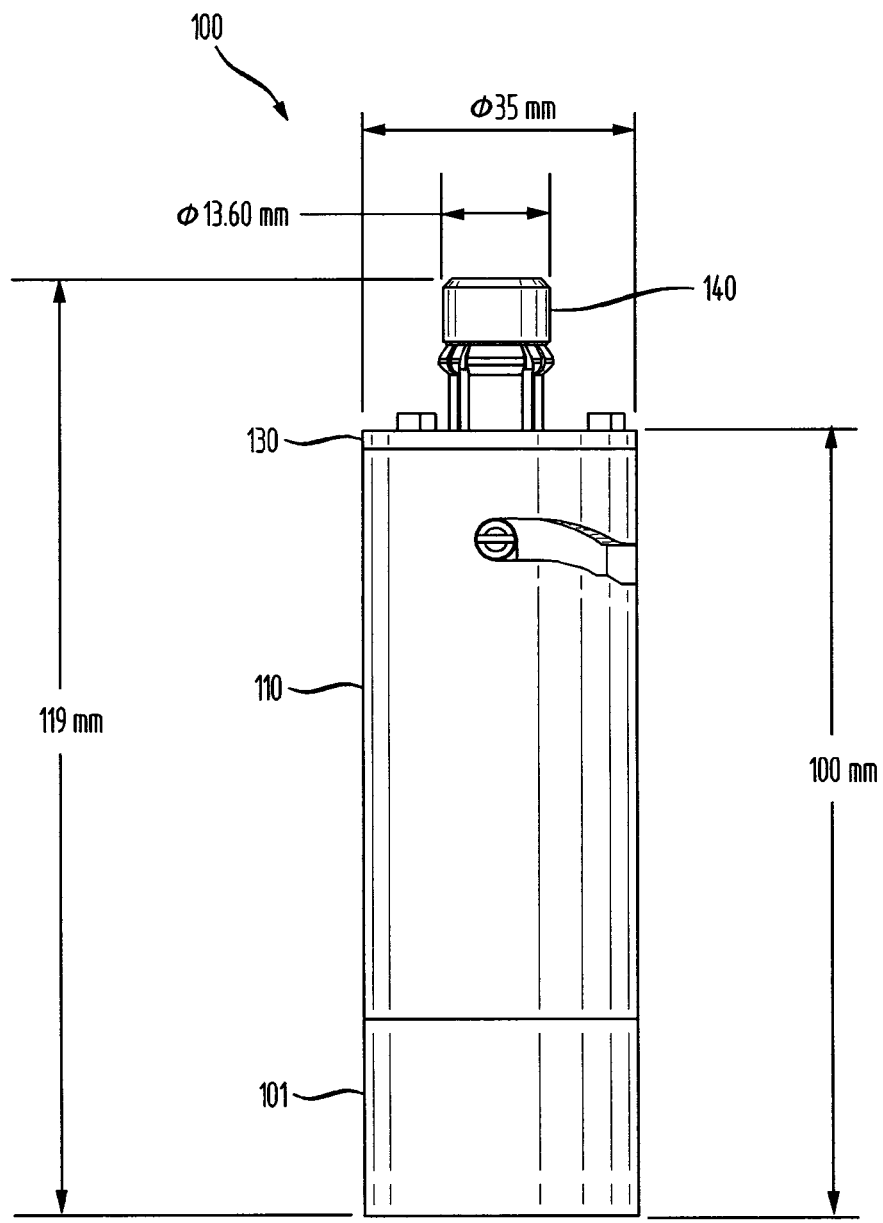
FIG. 3 illustrates dimensions of the quick mount adapter in an exemplary embodiment.

FIG. 3 illustrates dimensions of the quick mount adapter 100 in an exemplary embodiment. In particular, FIG. 3 shows the dimensions for the quick mount adapter 100 in an advantageous embodiment in which the quick mount adapter 100 is used with a ⅝-11 UNC threaded joint. In the embodiment of the FIG. 3, the overall length of the quick mount adapter 100 from the bottom of the base portion 102 of the main body to the head 144 of the catcher 140 is 119 mm. The length from the bottom of the main body 101 to the top surface of the locking cover 130 is 100 mm. The diameter of the base portion 102 of the main body 101, the rotatable cylinder 110, and the locking cover 130 is 35 mm, and the diameter of the head 144 of the catcher 140 is 13.60 mm.

Figure 4:
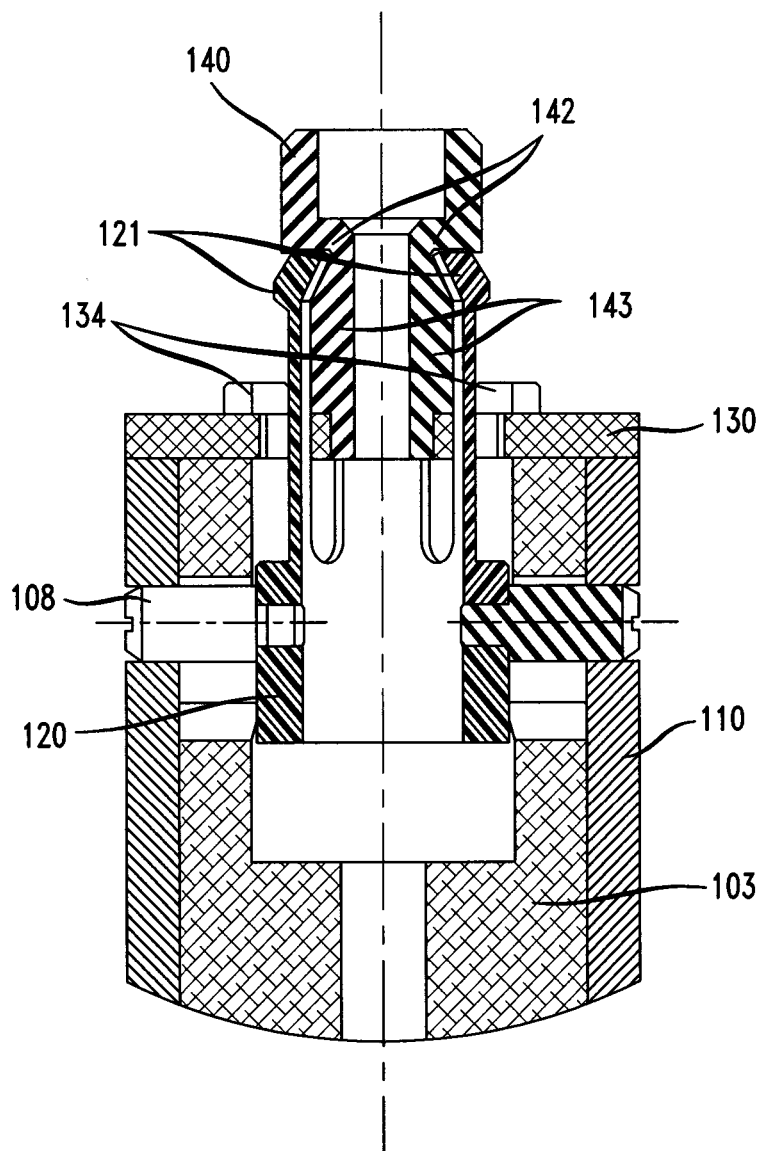
FIG. 4 illustrates a starting position of the quick mount adapter according to an embodiment of the present invention.
Figure 5:
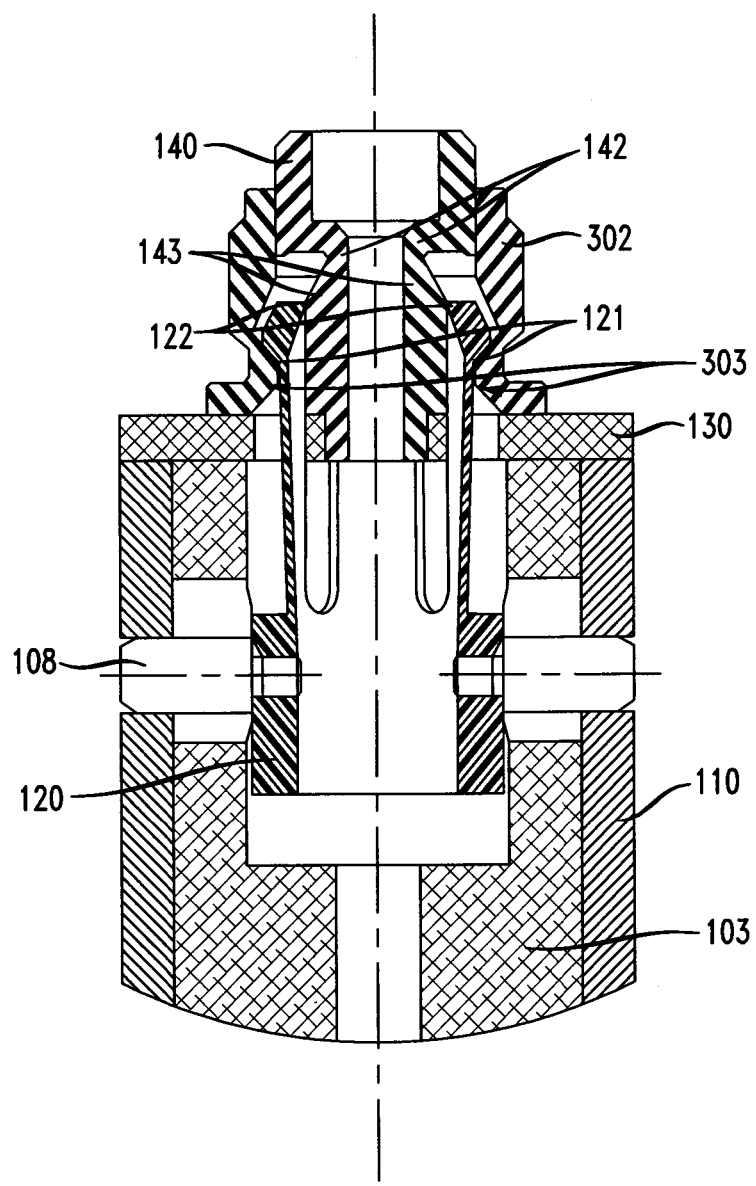
FIG. 5 illustrates a fixed position of the quick mount adapter in which a mountable device is mounted on the quick mount adapter according to an embodiment of the present invention.

FIGS. 4 and 5 illustrate the operation of the quick mount adapter 100 to mount a mountable device according to an embodiment of the present invention. FIG. 4 illustrates a starting position of the quick mount adapter 100. FIG. 5 illustrates a fixed position of the quick mount adapter 100 in which a mountable device is mounted on the quick mount adapter 100. As shown in FIG. 4, at the starting position, the rotatable cylinder 110 is turned counterclockwise as far as permitted by the lead screws 108 accommodated in the bayonet slots 111. The collet clamp 120 is at its top position, and the collets 121 are in an undisturbed state.

In order to mount a mountable device, such as a surveying device, onto the quick mount adapter 100, the mountable device is placed on the quick mount adapter 100 at the starting position. According to an advantageous embodiment mountable, the mountable device is provided with a special insert 302. The special insert 302 has an external thread for installing into a threaded socket of the mountable device and an inner thread forming a threaded socket for mounting the mountable device to a support apparatus. One feature of the special insert 302 is in addition to thread, an inner portion of the special insert 302 has a groove 303 designed to engage with the collets 121 of the collet clamp 120 of the quick mount adapter 100. The mountable device is placed on the quick mount adapter such that the head 144 of the catcher 140 is inside a socket of the special insert 302 installed within the mountable device. The bottom surface of the mountable device and/or the special insert 302 rests on the upper surface of the locking cover 130 and the bosses 134 on the locking cover 130 engage with slots in the bottom surface of the special insert or mountable device. As shown in FIG. 5, once the mountable device is placed on the quick mount adapter 100, the rotatable cylinder 110 is rotated clockwise around the upper portion 103 of the main body 101. The bayonet slots 111 cause the lead screws 108 to move downward with respect to the upper portion 103 of the main body 101 when the rotatable cylinder is rotated clockwise, and the downward movement of the lead screws 108 causes the collet clamp 120 is move downward within the upper portion 103 of the main body 101. As the collet clamp 120 moves downward, the collets 121 slide along the shaft of the catcher 140 and move from the narrow part 142 to the wide part 143 of the shaft. The collets 121 are forced open by the wide part 143 of the catcher 140, which causes the thickened ends 122 of the collets 121 to engage with the groove 303 on the inner portion of the socket of the special insert 302, thereby holding the special insert 302 and the mountable device in the fixed position on the quick mount adapter 100.

Once a mountable device is mounted on the quick mount adapter, the mountable device is removed by implementing the steps of the mounting process in the reverse order. In particular, starting with the quick mount adapter 100 in the fixed position (FIG. 5) with a mountable device mounted on the quick mount adapter 100, the rotatable cylinder 110 is rotated counterclockwise to return the quick mount adapter to the starting position (FIG. 4). The bayonet slots 111 cause the lead screws 108 to move upward when the rotatable cylinder 110 is rotated counterclockwise, which forces the collet clamp 120 to move upward and the collets 121 to slide along the shaft of the catcher from the wide part 143 to the narrow part 142 and close inward. This causes the thickened end portions 122 of the collets 121 to disengage with the inner portion of the socket 302 of the mountable device. Once, the quick mount adapter 100 is returned to the starting position and the thickened end portions 122 of the collets no longer engage with the inner portion of the socket 302, the mountable device can be removed from the quick mount adapter 100. As described herein, in an advantageous embodiment, the rotatable cylinder 110 is rotated clockwise to put the quick mount adapter 100 in the fixed position and counterclockwise to return the quick mount adapter 100 to the starting position. It is to be understood that in other embodiments, these rotation directions may be reversed by sloping the bayonet slots 111 in the opposite direction.

Figure 6:
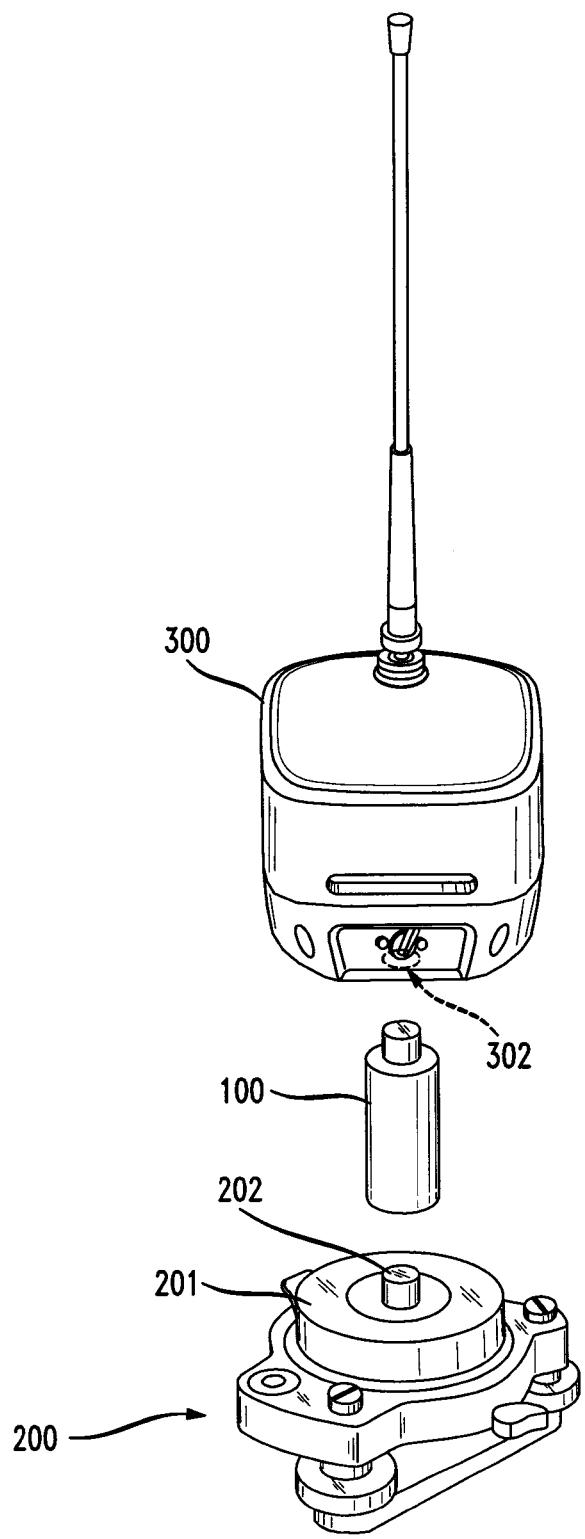
FIG. 6 illustrates a mountable device mounted to a support apparatus using the quick mount adapter according to an embodiment of the present invention.

FIG. 6 illustrates a mountable device mounted to a support apparatus using the quick mount adapter according to an embodiment of the present invention. As illustrated in FIG. 6, the support apparatus is a tribrach 200 and the mountable device is a GNSS receiver 300. As is well known, a tribrach 200 is an attachment plate used to attach a surveying instrument, such as a theodolite, total station, GNSS antenna, etc., to a tripod. The tribrach 200 includes a rotating tribrach adapter 201 and an external guided screw 202 extending from the rotating tribrach adapter 201. For example, the external guided screw 202 may be a ⅝-11 UNC screw, but the present invention is not limited thereto. The quick mount adapter 100 is fixed to the tribrach 200 via a threaded joint by screwing the external guided screw 202 of the tribrach 200 into the internal threading of the main body 101 of the quick mount adapter 100. According to an advantageous embodiment, the GNSS receiver 300 is provided with a special insert 302. The special insert 302 has an external thread for installing into a threaded socket of the mountable device and an inner thread forming a threaded socket for mounting the GNSS receiver 300 to a support apparatus. For example, the special insert 302 may be a ⅝-11 UNC threaded socket, but the present invention is not limited thereto. In addition to thread, an inner portion of the special insert 302 has a groove 303 designed to engage with the collets 121 of the collet clamp 120 of the quick mount adapter 100. A bottom portion of the special insert 302 or the mountable device (e.g., GNSS receiver 300) can include a plurality of slots to engage with the plurality of bosses 134 on the locking cover 130 of the quick mount adapter 100. The GNSS receiver 300 is mounted on the quick mount adapter 100 by placing the socket of the special insert 302 on the head 144 of the catcher 140 of the quick mount adapter 100 and rotating the rotatable cylinder 110 of the quick mount adapter 100 to put the quick mount adapter 100 in the fixed position, as described above in connection with FIGS. 4 and 5. The GNSS receiver 300 is dismounted from the quick mount adapter by rotating the rotatable cylinder 110 of the quick mount adapter 100 to return the quick mount adapter 100 to the starting position, as described above in connection with FIGS. 4 and 5, and then removing the GNSS receiver 300 from the quick mount adapter 100. Since the quick mount adapter 100 is fixed onto the tribrach 200, the GNSS receiver 300 can be mounted on the tribrach 200 and removed from the tribrach 200 quickly and easily using the quick mount adapter 100, without having to screw/unscrew the external guided screw 202 of the tribrach 200 into or out of a socket of the surveying device 300.

In the embodiments described above, the quick mount adapter 100 connects a support apparatus having an external threaded screw of a certain size (e.g., ⅝-11 UNC) with a mountable device having a compatible sized socket. In another possible embodiment, the quick mount adapter 100 can also be used to connect a support apparatus with a certain size threaded screw with a mountable device having a different sized socket. In this case, the internal threading of the main body 101 can be sized to be threaded onto a first sized external threaded screw and the head 144 of the catcher can be sized to fit within a second sized socket.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A quick mount adapter for mounting a mountable device onto a support apparatus, comprising:
    a main body including an internal threading for attaching the main body to an external screw of the support apparatus;
    a rotatable cylinder rotatable with respect to the main body;
    a locking cover attached to the main body and disposed above the rotatable cylinder;
    a catcher attached to the locking cover and comprising a shaft having a narrow upper part and a wide lower part;
    a collet clamp moveable in a translational direction with respect to the main body and comprising a plurality of collets that grip the shaft of the catcher; and
    lead screws fixed to the collet clamp that transfer rotational movement of the rotatable cylinder to translational movement of the collet clamp such that rotation of the rotatable cylinder causes the collet clamp to move between a first position in which the collets are in an undisturbed state around the narrow part of the shaft of the catcher and a second position in which the collets grip the wide part of the shaft of the catcher.

2. The quick mount adapter of claim 1, wherein the rotatable cylinder comprises bayonet slots that accommodate the lead screws and force the lead screws and the collet clamp to move downward with respect to the main body when the rotatable cylinder is rotated in a first direction and upward with respect to the main body when the rotatable cylinder is rotated in a second direction.

3. The quick mount adapter of claim 2, wherein the main body comprises a base portion and an upper portion having a smaller diameter than the base portion, and the rotatable cylinder sits on top of the base portion with the upper portion inside of the rotatable cylinder and rotates around the upper portion of the main body.

4. The quick mount adapter of claim 3, wherein the locking cover is attached to an upper surface of the upper portion of the main body.

5. The quick mount adapter of claim 4, wherein a diameter of rotatable cylinder and a diameter of the locking cover are equal to the diameter of the based portion of the main body, and a length of the rotatable cylinder is equal to a length of the upper portion of the main body.

6. The quick mount adapter of claim 4, wherein the upper portion of the main body comprises a central opening that accommodates the collet clamp such that a bottom portion of the collet clamp is disposed within the upper portion of the main body.

7. The quick mount adapter of claim 6, wherein the upper portion of the main body further comprises side openings through which the lead screws pass to reach the collet clamp, and the side openings permit the lead screws to move upward and downward with respect to the upper portion of the main body to move the collet clamp within the upper portion of the main body between the first position and the second position.

8. The quick mount adapter of claim 6, wherein the locking cover comprises a plurality of collet slots through which the plurality of collets pass.

9. The quick mount adapter of claim 8, wherein the catcher is connected to the locking cover via a threaded joint surrounded by the plurality of collet slots through which the plurality of collets pass.

10. The quick mount adapter of claim 1, wherein each of the plurality of collets comprises a thickened end portion to engage with an inner portion of a socket of a mountable device configured to be placed on the catcher when the collet clamp is in the second position in which the collets grip the wide part of the shaft of the catcher.

11. The quick mount adapter of claim 10, wherein the thickened end portion of each of the plurality of collets disengage with the inner portion of the socket of the mountable device when the collet clamp is in the first position in which the collets are in the undisturbed state around the narrow part of the shaft of the catcher.

12. The quick mount adapter of claim 1, wherein the locking cover comprises a plurality of bosses to engage with slots on a bottom surface of the mountable device.

13. A system comprising:
a support apparatus comprising an external threaded screw;
a mountable device comprising an insert including a threaded socket and a groove formed on an inner portion of the socket; and
a quick mount adapter for mounting the mountable device on the support apparatus, comprising:
a main body including an internal threading that attaches the main body to the external screw of the support apparatus,
a rotatable cylinder rotatable with respect to the main body,
a locking cover attached to the main body and disposed above the rotatable cylinder,
a catcher extending from the locking cover to be inserted within the socket of the mountable device and comprising a shaft having a narrow upper part and a wide lower part,
a collet clamp moveable in a translational direction with respect to the main body and comprising a plurality of collets that grip the shaft of the catcher, each of the plurality of collets comprising a thickened end portion, and
lead screws fixed to the collet clamp that transfer rotational movement of the rotatable cylinder to translational movement of the collet clamp such that rotation of the rotatable cylinder causes the collet clamp to move between a first position in which the collets are in an undisturbed state around the narrow part of the shaft of the catcher and a second position in which the collets grip the wide part of the shaft of the catcher and the thickened end portion of each of the plurality of collets engages with the groove formed on the inner portion of the socket of the mountable device to fix the mountable device on the quick mount adapter.

14. The system of claim 13, wherein the rotatable cylinder comprises bayonet slots that accommodate the lead screws and force the lead screws and the collet clamp to move downward with respect to the main body when the rotatable cylinder is rotated in a first direction and upward with respect to the main body when the rotatable cylinder is rotated in a second direction.

15. The system of claim 14, wherein to mount the mountable device on the support device, the socket of the mountable device is placed on the catcher of the quick mount adapter with the collet clamp at the first position, and the rotatable cylinder is rotated in the first direction causing the lead screws to move the collet clamp downward with respect to the main body to the second positon at which the collets grip the wide part of the shaft of the catcher and the thickened end portion of each collet engages with the groove formed on the inner portion of the socket.

16. The system of claim 15, wherein to dismount the mountable device from the support device, the rotatable cylinder is rotated in the second direction causing the lead screws to move the collet clamp upward with respect to the main body to the first position at which the collets are in the undisturbed state around the narrow part of the shaft of the catcher and the thickened end portion of each collet is not engaged with the groove formed on the inner portion of the socket.

17. The system of claim 13, wherein a bottom surface of the insert of the mountable device comprises a plurality of slots, and the locking cover of the quick mount adapter comprises a plurality of bosses to engage with the plurality of slots on the bottom surface of the insert of the mountable device.

18. The system of claim 14, wherein the main body of the quick mount adapter comprises a base portion and an upper portion having a smaller diameter than the base portion, and the rotatable cylinder sits on top of the base portion with the upper portion inside of the rotatable cylinder and rotates around the upper portion of the main body.

19. The system of claim 18, wherein the upper portion of the main body comprises a central opening that accommodates the collet clamp such that a bottom portion of the collet clamp is disposed within the upper portion of the main body.

20. The system of claim 19, wherein the upper portion of the main body further comprises side openings through which the lead screws pass to reach the collet clamp, and the side openings permit the lead screws to move upward and downward with respect to the upper portion of the main body to move the collet clamp within the upper portion of the main body between the first position and the second position.

21. The system of claim 19, wherein the locking cover comprises a plurality of collet slots through which the plurality of collets pass.

22. The system of claim 21, wherein the catcher is connected to the locking cover via a threaded joint surrounded by the plurality of collet slots through which the plurality of collets pass.

23. The system of claim 13, wherein the support apparatus is a tripod.

24. The system of claim 13, wherein the support apparatus is a pole.

25. The system of claim 13, wherein the mountable device is a surveying device.

* * * * *

UNITED STATES PATENT AND TRADEMARK OFFICE
CERTIFICATE OF CORRECTION

PATENT NO. : 10,344,908 B2
APPLICATION NO. : 15/766053
DATED : July 9, 2019
INVENTOR(S) : Pavel Stanislavovich Yanchelik and Alexandr Anatolyevich Agafonov It is certified that error appears in the above-identified patent and that said Letters Patent is hereby corrected as shown below:

On the Title Page

Column 1, at Item (71), the residence information for the Applicant "Moscow (RU)" should read --Livermore, CA (US)--.

Signed and Sealed this
Tenth Day of September, 2019

Andrei Iancu
*Director of the United States Patent and Trademark Office*